United States Patent
Naylor

(10) Patent No.: US 9,950,718 B2
(45) Date of Patent: Apr. 24, 2018

(54) TRAIN NETWORK MANAGEMENT SYSTEM AND METHOD

(71) Applicant: Wabtec Holding Corp., Wilmerding, PA (US)

(72) Inventor: Michael A. Naylor, Brunswick, MD (US)

(73) Assignee: Wabtec Holding Corp., Wilmerding, PA (US)

( * ) Notice: Subject to any disclaimer, the term of this patent is extended or adjusted under 35 U.S.C. 154(b) by 139 days.

(21) Appl. No.: 14/767,441

(22) PCT Filed: Mar. 12, 2014

(86) PCT No.: PCT/US2014/024159
§ 371 (c)(1),
(2) Date: Aug. 12, 2015

(87) PCT Pub. No.: WO2014/165024
PCT Pub. Date: Oct. 9, 2014

(65) Prior Publication Data
US 2016/0016596 A1 Jan. 21, 2016

Related U.S. Application Data

(60) Provisional application No. 61/779,541, filed on Mar. 13, 2013.

(51) Int. Cl.
*G06F 13/00* (2006.01)
*B61L 15/00* (2006.01)
*B61L 25/04* (2006.01)
*H04L 29/08* (2006.01)

(52) U.S. Cl.
CPC ....... *B61L 15/0018* (2013.01); *B61L 15/0027* (2013.01); *B61L 15/0036* (2013.01); *B61L 15/0072* (2013.01); *B61L 25/04* (2013.01); *H04L 67/12* (2013.01)

(58) Field of Classification Search
CPC ............. B61L 15/0027; B61L 15/0036; B61L 15/0018; B61L 15/0072; B61L 25/04; H04L 67/12
USPC ......................... 709/220–222, 238, 239, 245
See application file for complete search history.

(56) References Cited

U.S. PATENT DOCUMENTS

| 6,163,089 | A | 12/2000 | Kull |
| 6,950,460 | B1 | 9/2005 | Cappelletti et al. |
| 7,073,753 | B2 * | 7/2006 | Root ..................... B60T 13/662 246/72 |

(Continued)

*Primary Examiner* — Kenneth R Coulter
(74) *Attorney, Agent, or Firm* — The Webb Law Firm

(57) ABSTRACT

A train network management system for a train having a locomotive and railcars, including a node computer on the railcar and communicating with a high-speed network device for receiving and transmitting data over a high-speed network, and a locomotive computer on the locomotive and communicating with a high-speed network device for receiving and transmitting data over the high-speed network, where a communication path is generated between at least two high-speed network devices of the railcars and the high-speed network device of the locomotive, such that high-speed data communication is provided between the high-speed network devices of the railcars and the locomotive. A railcar network unit is also disclosed.

20 Claims, 4 Drawing Sheets

(56) References Cited

U.S. PATENT DOCUMENTS

| | | |
|---|---|---|
| 8,812,688 B2 * | 8/2014 | Luukkala ............ H04W 76/005 380/277 |
| 2002/0027495 A1 | 3/2002 | Darby, Jr. et al. |
| 2003/0183729 A1 * | 10/2003 | Root .................... B60T 13/662 246/167 R |
| 2005/0259598 A1 * | 11/2005 | Griffin .................. B61L 15/00 370/255 |
| 2007/0208841 A1 | 9/2007 | Barone et al. |
| 2010/0241295 A1 | 9/2010 | Cooper et al. |
| 2011/0075641 A1 | 3/2011 | Siriwongpairat et al. |
| 2011/0284699 A1 | 11/2011 | Cooper et al. |
| 2012/0079111 A1 * | 3/2012 | Luukkala .............. H04L 67/141 709/225 |
| 2012/0123617 A1 | 5/2012 | Noffsinger et al. |
| 2014/0359143 A1 * | 12/2014 | Luukkala ............ H04W 76/005 709/227 |

* cited by examiner

TRAIN NETWORK MANAGEMENT SYSTEM AND METHOD

CROSS REFERENCE TO RELATED APPLICATIONS

This application claims benefit of priority from U.S. Provisional Patent Application No. 61/779,541, filed Mar. 13, 2013, which is incorporated herein by reference in its entirety.

BACKGROUND OF THE INVENTION

Field of the Invention

The present invention relates generally to trains and train control systems, including communication systems and architectures used on or aboard trains, and in particular to a train network management system and method for use on a train having at least one locomotive and multiple railcars.

Description of the Related Art

As is known in the art, and in the railroad industry, communication on or aboard a train is required in order to effectively and safely operate the train, which includes one or more locomotives and multiple railcars. This communication aspect is particularly important in connection with an electronically-controlled pneumatic (ECP) train, i.e., a train using ECP brakes on one or more of the railcars to provide a distributed braking function, and which requires data communication, such as over an ECP network, in order to effectively implement. One example of an ECP communication system and arrangement is shown and described in U.S. Pat. No. 6,163,089, entitled "Railway Locomotive ECP Train Line Control," the contents of which are incorporated herein by reference.

Such an existing ECP network utilizes a slow data rate power line transceiver operating over a wired communication line that extends by and between the locomotive and the railcars. This line (often referred to as the "Trainline") is used for both power delivery and low data rate communications, thus representing a low-speed network. As is known, this network is based on the EIA-709 PLT control network protocol and standard, which has a raw data rate of 5,000 Kbps. This low data rate limits the ability of the network to supply information from each railcar (i.e., "node") in the network to the locomotive. Under normal network usage, the messages required by the Association of American Railroads (AAR) Standard S-4200 Series already consume nearly 50% of the network bandwidth. Due to the requirement to maintain bandwidth for supporting and communicating critical exceptions (e.g., safety-critical data and information), only limited data can be effectively or usefully transmitted over this slow-speed Trainline.

In order to enhance or improve safety, operations, efficiency, and the like, data regarding the train (including its locomotives and railcars) and the surrounding environment may be collected locally at various points or areas on or around the train. Accordingly, there is a need in the art for "smart car" technology, based upon the railroad operators' desire to collect and process information and data at or along these points and area on or around the train. However, as discussed above, the current slow-speed network Trainline architecture is limited to facilitating the communication of data regarding safety-critical failure events to the locomotive. This prevents devices and any sensors on the railcars and locomotives from monitoring in a dynamic manner (e.g., in "real time"), thus limiting operation and "decision making" of these devices based on a small set of local data.

As discussed above, the locomotive and the railcars include a variety of sensors that provide data that is useful to rail operators for performing more advanced preventative diagnostics. Further, some new sensor technologies, e.g., acoustic and vibration sensors, may be used to provide additional useful information; however, such sensors produce a significant amount of data that must be processed and analyzed. Such sensor technology would force such processing and analysis to be performed locally, which increases the cost of the hardware required to be installed on each railcar. In addition, such complex computers and hardware complicates troubleshooting and leads to maintenance issues. Still further, such local processing and analysis complicates data collection, since each railcar must log its own data, and be individually queried for its data manually.

Accordingly, there is a need in the art for improved train network systems and data collection and analytical systems and methods for railroad operators. In addition, there is a need in the art for train network management systems and methods that can be implemented in connection with existing hardware and equipment on a railcar. Still further, there is a need in the art for improved train networks system and data collection and analytical systems that can be used in connection with a variety of sensor technologies and data outputs and for effectively communicating and distributing the associated data.

SUMMARY OF THE INVENTION

Generally, provided are a train network management system and method that overcome or addresses some or all of the above-discussed deficiencies and drawbacks associated with existing train networks and control systems. Preferably, provided are a train network management system and method that provide improved train network systems and data collection and analytical systems and methods for railroad operators. Preferably, provided are a train network management system and method that can be implemented in connection with existing hardware and equipment on a railcar. Preferably, provided are a train network management system and method that are useful in connection with a variety of sensor technologies and data outputs, and for effectively communicating and distributing the associated data.

Accordingly, and in one preferred and non-limiting embodiment, provided is a train network management system for a train having at least one locomotive and a plurality of railcars. The system includes at least one node computer positioned on or integrated with a plurality of the railcars and configured, programmed, or adapted to communicate with at least one high-speed network device for receiving and transmitting data over a high-speed network. The at least one node computer, the at least one high-speed network device, and/or at least one associated railcar is assigned a unique identifier. Further, at least one locomotive computer is positioned on or integrated with the at least one locomotive and configured, programmed, or adapted to communicate with at least one high-speed network device for receiving and transmitting data over the high-speed network. The at least one node computer and/or the at least one locomotive computer is configured, programmed, or adapted to generate at least one communication path between at least two high-speed network devices of at least two railcars and the high-speed network device of the locomotive, such that high-speed data communication is provided between the at least two high-speed network devices of the at least two railcars and the high-speed network device of the locomotive.

In another preferred and non-limiting embodiment, provided is a computer-implemented method of managing a network on a train having at least one locomotive and a plurality of railcars, wherein a wired communication line extends by and between the at least one locomotive and the plurality of railcars. The method includes: (a) providing at least one node computer on a plurality of the railcars, the at least one node computer configured, programmed, or adapted to communicate with at least one high-speed network device for receiving and transmitting data over a high-speed network; (b) providing at least one locomotive computer on at least one locomotive, the locomotive computer configured, programmed, or adapted to communicate with at least one high-speed network device for receiving and transmitting data over the high-speed network; (c) determining or obtaining, by the at least one locomotive computer, a unique identifier for the node computer of the railcar, the high-speed network device of the railcar, and/or the associated railcar; (d) generating, by the at least one node computer and/or the at least one locomotive computer, at least one communication path between at least two specified high-speed network devices of at least two railcars and the high-speed network device of the locomotive; and (e) transmitting the at least one communication path over the wired communication line to the specified high-speed network devices via the associated node computer of the associated railcar.

In a further preferred and non-limiting embodiment, provided is a railcar network unit for a train having a plurality of railcars and at least one locomotive. The railcar network unit includes at least one high-speed network device configured, programmed, or adapted to receive and transmit data over a high-speed network, and at least one node computer. The at least one node computer is configured, programmed, or adapted to: (i) communicate with and at least partially control the at least one high-speed network device; (ii) communicate with at least one sensor device configured to sense at least one condition at or near a specified railcar; and (iii) generate train data based at least partially on the sensed condition. In addition, the at least one high-speed network device is configured, programmed, or adapted to transmit at least a portion of the train data.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

Figure 1:
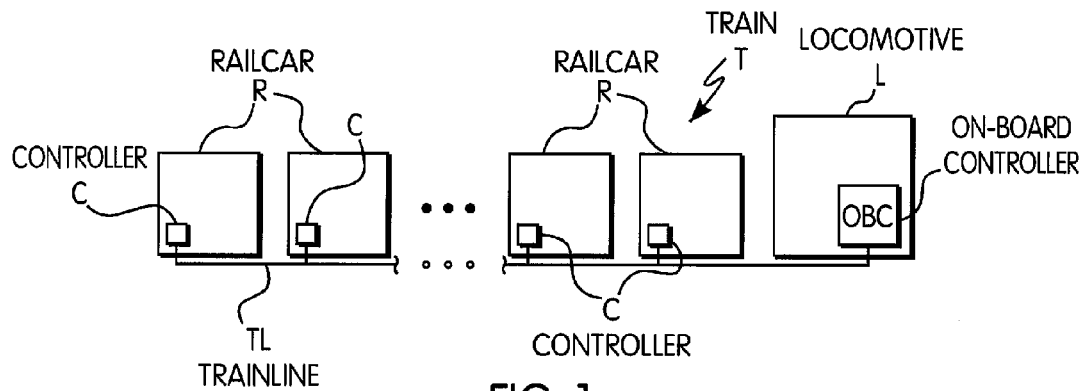
FIG. 1 is a schematic view of a train having a wire communication line according to the prior art.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device over a communication path. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, and/or the like. Further, a variety of wired or wireless network devices may be used, including, but not limited to, a wireless network device, a wired network device, a WiFi network device, a Bluetooth network device, a Zigbee network device, a WirelessHART network device, a GPRS network device, an ultra-wideband network device, a cable network device, a wide-band network device, a multi-radio network device, and the like.

One exemplary and known train T arrangement is illustrated in FIG. 1. In particular, and as is known, the train T includes one or more locomotives L and multiple railcars R. The locomotive L includes an on-board controller (OBC) (or train management computer), which is in communication with various local controllers C positioned on each railcar R. In particular, and as discussed above, a physical cable or wired communication line, i.e., a "trainline" TL, extends from the locomotive L, e.g., the on-board controller OBC of the locomotive L, to and between the railcars R. In particular, the trainline TL is used for data communication from the individual railcars R to the on-board controller OBC using the local controllers C at each railcar R. As also discussed above, limited information and data is transmitted over the network established on the trainline TL, as this network is based on the EIA-709 PLT control network protocol and standard. Again, this severely limits the amount of information data that can be provided to the on-board controller OBC, typically limited to only safety-critical data and information. Therefore, if information and data from various sensors or other data points at each railcar R is to be collected and analyzed, it must either occur locally, such as on the local controller C, or at a later point in time, such as after the train T has reached its destination or is otherwise capable of providing the other information and data to some other computer or computer system.

In order to address this issue and provide a data-rich environment for use in train operation analytics and heuristic processes, provided is a train network management system 10 for use on or integrated with a train T, and which is illustrated in various preferred and non-limiting embodiments in FIGS. 2-7. In particular, and with reference to FIG. 2, in one preferred and non-limiting embodiment, the train network management system 10 includes a node computer 12 that is positioned on or integrated with one or more of the railcars R in the train T. This node computer 12, such as a network computer or other computing device, is configured, programmed, or adapted to communicate with one or more high-speed network devices 14. These high-speed network devices 14 are configured, programmed, or adapted to receive and transmit data over a high-speed network, i.e., multiple high-speed network devices 14 in direct or indirect communication. In addition, the node computer 12, the high-speed network device 14, and/or the associated railcar R are assigned or include some unique identifier, such as alphanumeric text, a serial number, equipment identification information, and the like. As discussed hereinafter, it is this unique identifier that may be used to build the high-speed network for efficient and effective communication between the railcars R and the locomotive L.

Figure 2:
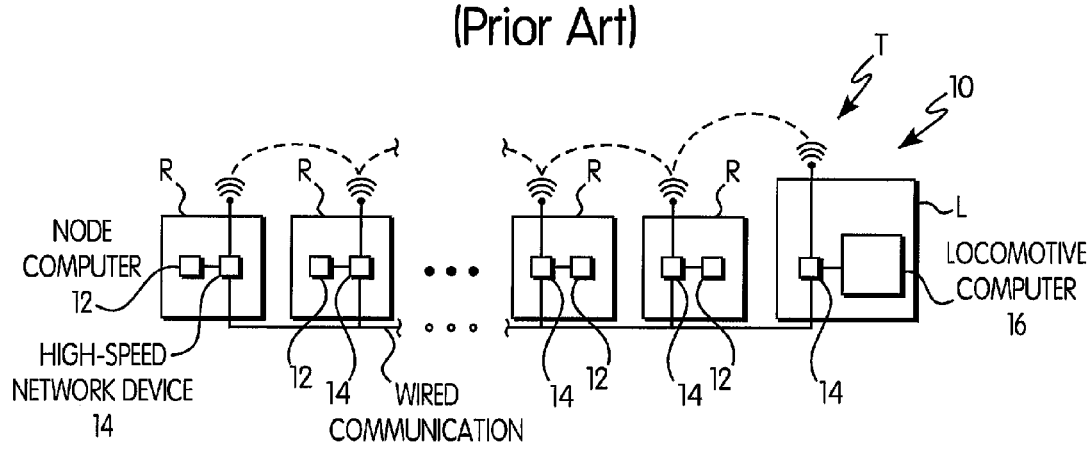
FIG. 2 is a schematic view of one embodiment of a train network management system according to the principles of the present invention.

With continued reference to FIG. 2, the system 10 includes one or more locomotive computers 16 positioned on or integrated with each locomotive L in the train T. This locomotive computer 16 is configured, programmed, or adapted to directly or indirectly communicate with a high-speed network device 14, which again, is configured, programmed, or adapted to receive and transmit data over the high-speed network. As discussed above, this locomotive computer 16 may be in the form of or part of the on-board controller OBC, the train management computer, or any other computer or computing device associated with the locomotives L of the train T. As referred to hereinafter, each railcar R (or its on-board components, e.g., the node computer 12 and/or the high-speed network device 14) represents a "node" in the high-speed network, with the primary goal of providing information data from the individual railcars R to the locomotive L or locomotives L with which the railcar R is associated or assigned.

In another preferred and non-limiting embodiment, the node computer 12 and/or the locomotive computer 16 is configured, programmed, or adapted to identify, build, and/or generate a communication path 18 on or within the high-speed network by and between at least two communicating high-speed network devices 14 of at least two railcars R, as well as the high-speed network device 14 of at least one locomotive L. In this manner, high-speed data communication is provided between the high-speed network devices 14 of the railcars R and the high-speed network device 14 of the locomotive L. Accordingly, a high-speed network is provided and/or overlaid on the train T in addition to or in replacement of the existing hard-wired communication architecture. The information and data transmitted over this high-speed network may include train data, specified data, track data, environment data, redundant data, safety-critical data, and the like. Further, the high-speed network device 14 may take a variety of forms and designs, and may be a wireless network device, a wired network device, a WiFi network device, a Bluetooth network device, a Zigbee network device, a WirelessHART network device, a GPRS network device, an ultra-wideband network device, a cable network device, a wide-band network device, and/or a multi-radio network device.

As also illustrated in FIG. 2, the high speed network device 14 on each railcar R and/or the locomotive L may be wireless only, hard-wired only, or for redundancy or other purposes, some combination of both types of wireless and wired protocols. Accordingly, in one preferred and non-limiting embodiment, the high-speed network provided and created by the system 10 represents or is based upon a high-data rate protocol on each railcar R that would operate separately from the existing ECP network (e.g., over the trainline TL). In particular, information and data could be routed to the locomotive L, where the locomotive computer 16 (or some other central controller, e.g., a remote central controller 26 at central dispatch, or some other remote server) could effectively process and analyze the data, such as based upon historical patterns and heuristics. Accordingly, this high-speed network may be in the form of or based upon a wireless protocol, or alternatively, a high-speed protocol could be used in connection with the existing trainline TL that would operate outside of the EIA-709 band.

In another preferred and non-limiting embodiment, and in certain instances where the train T is long and includes a large number of railcars R and/or locomotives L, distance issues may arise. As is known, a freight train network has a linear topology that can extend for well over a mile, and, as discussed, the power consumption of the trainline TL is limited, per the S-4200 standard. In addition, and with respect to known wireless technologies, cross-communication issues may arise between nodes or railcars R of trains T on adjacent tracks. Still further, Near-Far problems and propagation delay on the trainline TL may prevent collision avoidance algorithms from operating effectively. Accordingly, and in a further preferred and non-limiting embodiment, the train network management system 10 of the present invention initializes and organizes network resources in an efficient manner, such that the high-speed network devices 14 are provided with specific routing or "communication paths" 18 for communicating data between railcars R and/or to the locomotive L.

Figure 3:
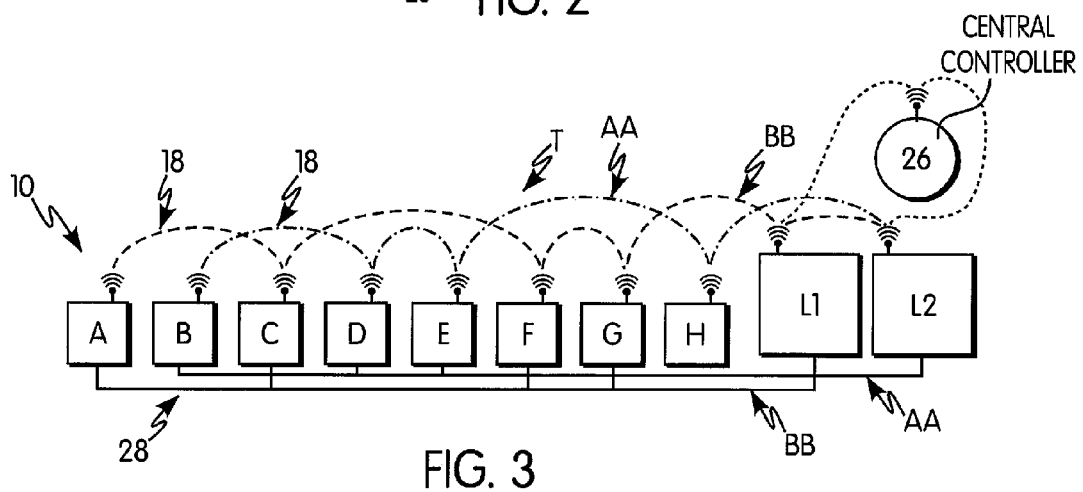
FIG. 3 is a schematic view of another embodiment of a train network management system according to the principles of the present invention.

Accordingly, and in one preferred and non-limiting embodiment, as illustrated in FIG. 3, at least one communication path 18 is generated and specified between various high-speed network devices 14, which communicate with one or more leading high-speed network devices and/or one or more trailing high-speed network devices. In the exemplary embodiment of FIG. 3, railcar B (and/or the high-speed network device 14 and/or node computer 12 of railcar B) is in communication with a leading railcar D, such that railcar B is the trailing railcar R of railcar D. Railcar E is the leading railcar R of railcar D (such that railcar D is the trailing railcar R of railcar E), and railcar H is the leading railcar R of railcar E (such that railcar E is the trailing railcar R of railcar H). Finally, the locomotive L2 is the leading railway vehicle (or high-speed network device 14) of railcar H, since locomotive L2 is the assigned locomotive L. Accordingly, the first communication path AA (whether wirelessly or over the wired communication line 28) is as follows: B→D→E→H→L2.

A similar arrangement occurs with railcars A, C, F, G, and locomotive L1. In particular, this second communication path BB (whether wirelessly or over the wired communication line 28) is as follows: A→C→F→G→L1. In this manner, data from any of the trailing railcars R is transmitted (whether wirelessly or in a hard-wired form) to its leading railcar R (and/or its respective high-speed network device 14 or node computer 12) and directly or indirectly to the high-speed network device 14 or locomotive computer 16 of the locomotive L. Similarly, information, commands, control signals, data, and/or information is provided from the locomotive L to its trailing railcar R and back through the communication path 18 to any specific railcar R in the path 18. By using the specifically-designated communication paths 18, AA, BB, the train network management system 10 facilitates appropriate data communication and distribution over the high-speed network regardless of the length of the train T.

Figure 4:
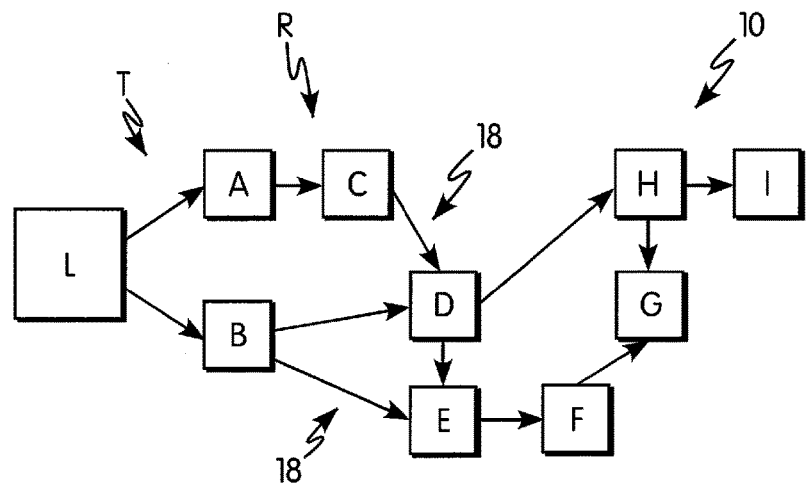
FIG. 4 is a schematic view of a further embodiment of a train network management system according to the principles of the present invention.

In another preferred and non-limiting embodiment, and as illustrated in FIG. 4, the railcars R (and/or the node computers 12 and/or the high-speed network devices 14 of the railcars R and locomotives L) may also be arranged in the form of a mesh network 20. Such a mesh network 20 provides appropriate and alternate communication paths 18 between the various nodes, i.e., railcars R and locomotives L, with redundancy and fail-safe functionality. For example, information or data from the locomotive L can be routed in a variety of paths 18 over the network 20. For example, if information or data was to be provided from the locomotive L to railcar G, it may take the following communication path: L→A→C→D→H→G. However, if some error or other stoppage in communication occurs between the locomotive L and railcar A, the alternative communication path 18 may be as follows: L→B→E→F→G. Accordingly, using such a mesh network 20 provides a robust high-speed network for distribution of data and information by and between the railcars R and the locomotives L.

Figure 5:
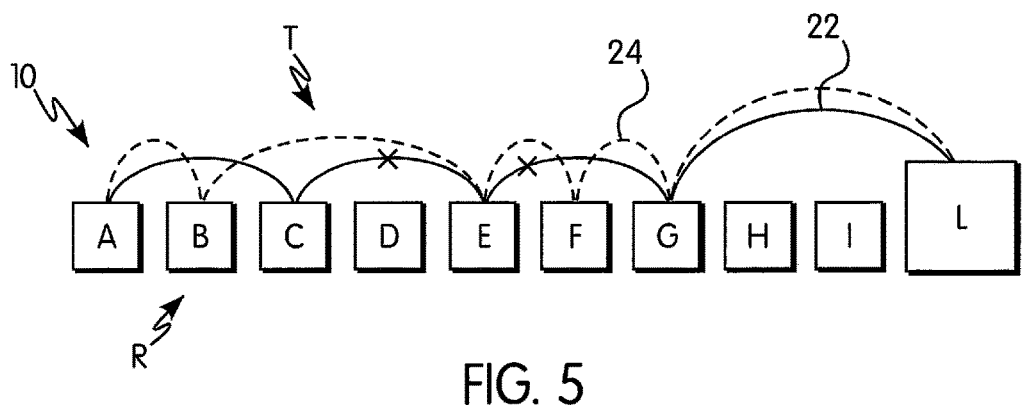
FIG. 5 is a schematic view of another embodiment of a train network management system according to the principles of the present invention.

In a still further preferred and non-limiting embodiment, and as illustrated in FIG. 5, one or more of the high-speed network devices 14 of the railcars R may be provided with a primary communication path 22 and one or more secondary communication paths 24. As with the mesh network 20 arrangement, by providing or assigning each railcar R or node with a primary communication path 22 and one or more secondary communication paths 24, information and data flowing over the high-speed network can still occur even if there is a communication error or other problem at any individual node (or railcar R). In the exemplary embodiment of FIG. 5, the primary communication path 22 of railcar E is as follows: A→C→E→G→L. However, in this example, the communication links have failed between both railcar E and railcars C and G. In this manner, the node computer 12 and/or the high-speed network device 14 uses its assigned secondary communication path 24, which is as follows: A→B→E→F→G→L. Any number of communication paths 18 can be assigned by or created by the system 10, such as by the individual node computer 12 at the railcar R and/or the locomotive computer 16 on the locomotive L. Again, these paths 18 may occur over a wireless protocol or a wired protocol, such as using an existing trainline TL of the train T.

In another preferred and non-limiting embodiment, each high-speed network device, whether on its own or through its respective controlling node computer 12 and/or locomotive computer 16, is configured, programmed, or adapted to determine which other high-speed network devices 14 are within its communication range. Based upon the devices 14 that are in the range of any particular high-speed network device 14, the device 14 establishes one or more sessions with one or more other devices 14 within this range. For example, these sessions may be established or set up according to a linear communication path 18, e.g., a leading high-speed network device 14 and a trailing high-speed network device 14, or in the above-discussed mesh network 20. In addition, these sessions may be used to form the above-discussed communication path 18, which may be established based upon a variety of existing or anticipated parameters. For example, these sessions and/or communication paths 18 may be based upon the assigned or generated communication path 18, the route or routing length or distance, a specified communication frequency, a specified signal strength, the type of device 14, the functionality of the device 14, the type of data or information that is to be transmitted or received, a specified communication type or protocol, instructions from the node computer 12, instructions from the locomotive computer 16, some node computer identifier, some locomotive computer identifier, some high-speed network device identifier, a railcar identifier, locomotive identifier and/or some train identifier. Such logic can either be programmed locally at the node computer 12 and/or high-speed network device 14, or based upon logic or specifications at the locomotive computer 16 or even at some off-site location, such as central dispatch or other remote server or controller.

In one preferred and non-limiting embodiment, central dispatch may make certain communication path decisions and transmit or communicate these decisions to the locomotive L (or even any individual railcar R) based upon additional information and data at its disposal. For example, central dispatch may make communication path decisions based upon other trains T in the railway network that may be in close proximity to the train T discussed herein. In addition, the communication path may be determined based upon the environment or other obstacles or structural features that may affect communications over this high-speed network in the train network management system 10. Accordingly, and as illustrated in FIG. 3, a remote central controller 26, such as at central dispatch, may provide instructions or other information and data to establish one or more communication paths 18 between the railcars R and locomotives L on the train T. Of course, it is also envisioned that a train T with multiple locomotives L may include some direct or indirect communication between the locomotives L to provide further beneficial high-speed data communication.

Figure 6:
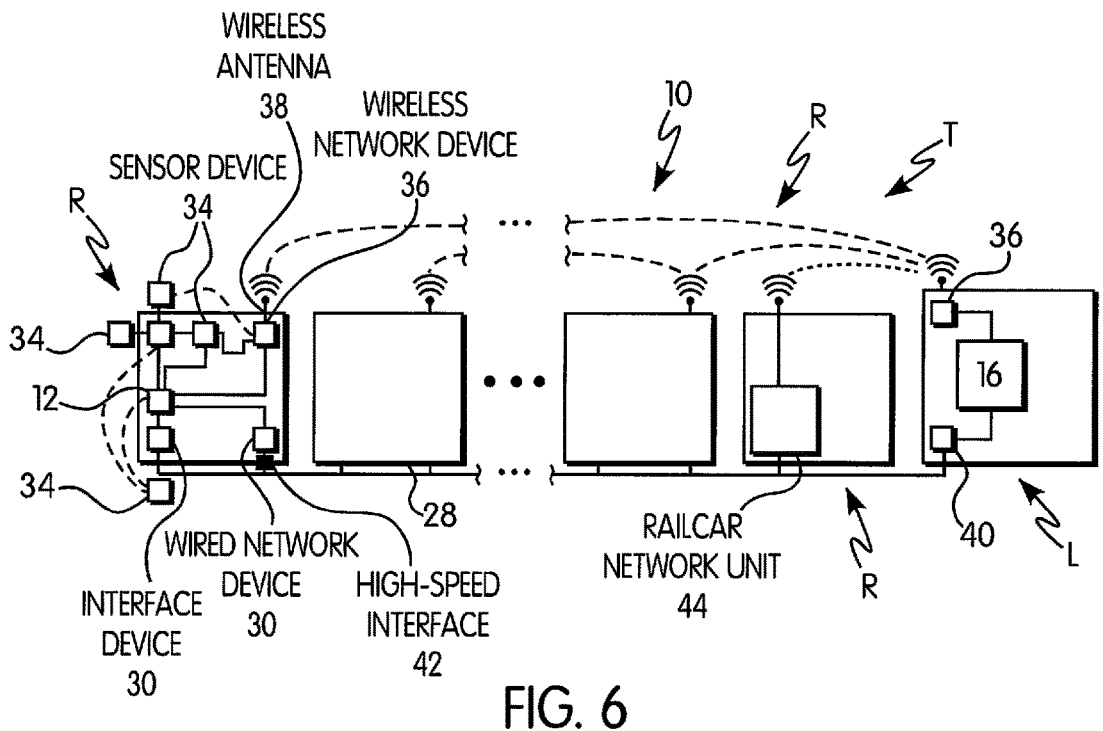
FIG. 6 is a schematic view of a still further embodiment of a train network management system according to the principles of the present invention.

In a still further and non-limiting embodiment, and as illustrated in FIG. 6, the train network management system 10 can utilize a wired communication line 28 that extends between the locomotives L and the railcars R. In one preferred and non-limiting embodiment, the above-discussed trainline TL forms the wired communication line 28. Although this trainline TL is slow, it provides sufficient bandwidth to set up and manage a separate high-speed network (as discussed above). As discussed hereinafter, this setup process may occur during the normal ECP initialization process. With continued reference to the preferred and non-limiting embodiment of FIG. 6, where the wired communication line 28 is in the form of the trainline TL, an interface device 30 is positioned on or integrated with each respective railcar R and is in communication with the node computer 12 (which, again, may be an existing local controller C on the railcar R). In this embodiment, the node computer 12 is configured, programmed, or adapted to receive data from the wired communication line, i.e., the trainline TL, via the interface device 30. Further, in this embodiment, and when the wired communication line 28 is the existing cable or trainline TL, this interface device 30 is an EIA-709 interface device. Still further, and in this preferred and non-limiting embodiment, the unique identifier of the railcar R, the unique identifier of the locomotive L, all or a portion of the communication path 18, and/or network management information is transmitted or communicated over the trainline TL, typically from the locomotive L (or the on-board controller OBC). This information and data allows the high-speed network devices 14 to initialize, establish communications, establish sessions, and/or otherwise form the high-speed network discussed above. It is further envisioned that the node computer 12 would have access to a database of all the high-speed network devices 14 that were found during an "ECP Acquire Cycle," as well as the sequence or network information of each device 14.

In one exemplary setup cycle, appropriate information will be transmitted to each railcar R or node, which will include a list of adjacent railcars R capable of routing data to the locomotive L, as well as a unique identifier for the lead locomotive L. This adjacency information may include information to route the data to the locomotive L, as well as the devices 14 further back in the train T. It is further envisioned that timing or frequency channels may be assigned to limit collisions between nodes or railcars R that are in close proximity. On trailing devices 14 (or railcars R), the node computer 12 will be used to communicate to the access technology to determine which of its resources were assigned, as well as obtain instructions as to which nodes to use for routing, and the destination locomotive identifier.

In this preferred and non-limiting embodiment, once each high-speed network device 14 is informed of its desired configuration, the device 14 would attempt to validate the adjacent devices 14, or "nodes," that are within communication range, and establish a session with at least two adjacent nodes with the best signal. One node would be used for data destined for the locomotive L, and the other would be used for data destined for a device 14 further back on the train T. These nodes would be defined as the primary routes or primary communication paths 22, and as discussed above, one or more secondary communication paths 24 may be provided for redundancy.

In another preferred and non-limiting embodiment, and when the locomotive L is configured or controlled to transmit data and information to a trailing railcar R, i.e., a trailing high-speed network device 14, the locomotive computer 16, and specifically the high-speed network device 14 on the locomotive L, transmits a packet to a specified, such as an adjacent, trailing device 14. If the trailing device 14 detects that the packet is not the final destination or intended recipient, it will forward the packet to its next adjacent node further from the locomotive L in the communication path 18. In addition, and after the trailing devices 14 have been initialized and configured, these devices 14 may communicate or transmit their status to the locomotive L, and this status may include the primary routing nodes, i.e., the primary communication path 22, and, if applicable, at least one secondary routing node, i.e., the secondary communication path 24. The locomotive computer 16 may then evaluate these results, and reassign or modify the communication path 18, if necessary. Further, and after this initialization and setup is complete, each node would maintain the communication connections to its assigned routing nodes. Should a connection fail, the device 14 would then transmit the appropriate indication on the trainline TL and, if possible, use any secondary established routes, such as the secondary communication path 24.

As discussed above, the train network management system 10 may also build or generate a mesh network 20, such as arranging the nodes to build a dynamic mesh network based on the number of "hops" to the lead locomotive L assigned to or advertised (e.g., broadcast) by each node. In addition, and in this embodiment, a combination of this approach, as well as the linear (leading/trailing) approach would allow the nodes to dynamically route information in the event the communication path 18 is interrupted. In addition, such a dynamic mesh network 20 will also limit the amount of management required from the locomotive L, and may rely on the medium access control (MAC) and data link layers (DLL) of the deployed network protocol. In a still further preferred and non-limiting embodiment, the train network management system 10 would create and/or assign priority to specified nodes, such that more bandwidth could be assigned statically or dynamically. This would facilitate assigning specific channels, with greater bandwidth, for those data streams that require this additional bandwidth. For example, this approach would facilitate the effective transmission of data, such as a video channel from the end-of-train (EOT) device and/or extracting data logs from individual devices or components.

With continued reference to FIG. 6, and in another preferred and non-limiting embodiment, the node computer 12, or in another embodiment, a separate application computer 32 is in direct or indirect communication with one or more sensor devices 34, which are configured to sense at least one condition or parameter at or near a specified railcar R or locomotive L. Further, the node computer 12 and/or the application computer 32 is configured, programmed, or adapted to generate train data based at least partially on this sensed condition or parameter. This train data may take a variety of forms and include many different data points, such as locomotive data (e.g., information and data related to the components and/or operation of the locomotives L), railcar data (e.g., information and data related to the components and/or operation of the railcars R), environmental data (e.g., information and data relating to the environment or environmental conditions at or near the railcar R or locomotive L), equipment data (e.g., information and data relating to the various operating components and equipment interactions on the train T), failure data (e.g., data relating to the failure of any one or more of the components or systems on the train T, including safety-critical information), acoustic data (e.g., information and data relating to bearing wear), temperature data (e.g., information and data relating to bearing temperatures, refrigeration monitoring, dragging brakes, and the like), accelerometer data (e.g., information and data related to truck hunting, wheel flats, derailment, track damage, run-in instances, ride-quality information, and the like), strain gauge data (e.g., information and data related to buff and draft forces, impact monitoring, and the like), linear displacement data (e.g., information and data related to piston travel, slack adjustment monitoring, and the like), laser displacement data (e.g., information and data related to wheel wear), input/output data (e.g., information and data related to any forms of generic I/O, hand brake state, hand brake control, door state control, hatch state control, brake shoe wear, and the like), activity data (e.g., information and data related to chemical activity, radio activity, hazardous material monitoring, and the like), video data (e.g., information and data related to security monitoring, end-of-train monitoring, and the like), pressure data (e.g., information and data related to empty/load measurements, brake force, and the like), part data (e.g., information and data related to any parts or components of the train T), condition data (e.g., information and data related to any condition that has occurred or is predicted to occur on the railcars R and/or locomotives L), derailment data (e.g., information and data related to derailment and similar instances), heuristic data (e.g., information and data including estimates, predictions, approximations, experimentation, analysis, and the like), and/or diagnostic data (e.g., information and data related to any analytical or diagnostic processes for any portions or components of the train T).

Accordingly, any appropriate sensor device 34 or system may be attached to, integrated with, or positioned with respect to the railcars R and/or locomotives L in order to effectively capture or obtain any of the information and data for generation of the train data. In addition, these sensor devices 34 may provide raw, pre-processed, or processed data and information to the node computer 12 and/or the application computer 32, and similarly, this raw, pre-processed, or processed data and information may be transmitted to the locomotive computer 16 and/or the central controller 26 for processing or post-processing. In addition, and in another preferred and non-limiting embodiment, the raw or pre-processed data from the sensor devices 34 can be transmitted directly to the locomotive computer 16 over the high-speed network, such as over the wireless network or the trainline TL. Certain preferred and non-limiting embodiments of the various arrangements of the sensor devices 34, the node computers 12, the application computers 32, and the locomotive computer 16, as well as their communication paths and protocols, are schematically illustrated in FIG. 6.

As discussed above, and in another preferred and non-limiting embodiment, the communication path 18 may include the assignment of priority to one or more of specified high-speed network devices 14. In addition, these high-speed network devices 14 may be configured, programmed, or adapted to broadcast a status at specified intervals or in a dynamic methodology. In another preferred and non-limiting embodiment, and as illustrated in FIG. 6, the high-speed network device 14 may be in the form of a wireless network device 36 that includes at least one wireless antenna 38, where this wireless network device 36 is configured, programmed, or adapted for wireless communication. Similarly, the high-speed network device 14 may include or be in the form of a wired network device 40 including at least one high-frequency interface 42, where this wired network device 40 is configured, programmed, or adapted for communication over a wired communication line 28, such as a specified band on the trainline TL. This high-speed network communication may be implemented over the wired communication line 28 (or trainline TL) using a variety of techniques and communication methods, such as those described in U.S. Pat. No. 6,950,460, entitled "Multichannel Transceiver of Digital Signals over Power Lines," the contents of which are incorporated herein by reference.

In another preferred and non-limiting embodiment, provided is a railcar network unit 44, which includes one or more components of the above-discussed train network management system 10. For example, as seen in FIG. 6, this railcar network unit 44 may include any one or more of the above-discussed node computer 12, high-speed network devices 14, interface device 30, application computer 32, sensor devices 34, wireless network devices 36, wireless antennae 38, wired network devices 40, and/or high-frequency interfaces 42. In addition, this railcar network unit 44 may be an integrated and combined unit that can be easily positioned on, near, or within each railcar R, and placed in direct or indirect communication with the trainline TL or other existing components and equipment on a railcar R. Of course, the sensor devices 34 may already be existing on the railcars R; and similarly, any existing computers or computing devices that can function within the described train network management system 10 may also be used. In this manner, the railcar network unit 44 may be customized or configured to any specific application, and in connection with any railcar R (and/or locomotive L).

In another preferred and non-limiting embodiment, provided are certain methods and processes that are used or implemented in connection with the train network management system 10 of the present invention. In one preferred and non-limiting embodiment, such methods or processes would be used in connection with or in addition to a standard initialization process. In particular, such methods and processes would effectively set up a wireless (or wired) high-speed network between each high-speed network device 14, such that data can be routed to and from one or more of the locomotives L.

In one preferred and non-limiting embodiment, a high-speed wireless network is established between railcars R, such that each railcar R may route information and data efficiently and effectively to the locomotive L at the front of the train T, or to a trailing component or device further back on the train T. Accordingly, and in one preferred and non-limiting embodiment, the setup sequence would be as follows: (1) the ECP system is initialized, and the locomotive L (e.g., the on-board controller OBC or locomotive computer 16) contains a list of all of the trailing devices (e.g., the high-speed network devices 14 of the railcars R), as well as their sequence of position in the train T, as per the S-4200 standard; (2) the locomotive L queries each railcar R for its unique wireless identifier, which may be synonymous with a WiFi SSID; (3) the locomotive L transmits a message on the trainline TL instructing each trailing device 14 to enable the wireless network device 36 and/or the wired network device 40 on a specific channel and/or frequency; (4) each high-speed network device 14 transmits its static identifier at regular intervals in order to broadcast its availability to other high-speed network devices 14 (or nodes) in close or effective proximity; (5) each device 14 also scans the surrounding area and reports all adjacent devices 14 that are within detection range, as well as the associated received signal strength indication (RSSI) to the node computer 12, such that these devices 14 are stored as "adjacent" devices 14; (6) after the devices 14 have scanned their environment, the locomotive L will send a query on the trainline TL to query the node computer 12 on each device 14 for its list of adjacent nodes and a respective RSSI; (7) based on the adjacency list received from each device 14, and the known sequence of the train T, the locomotive L will send messages over the trainline TL to assign one or more wireless identifications to each device 14 that correspond to the nodes that will be used to transmit data and information to the locomotive L—(This information and data is sent to the devices 14 and/or the node computer 12, and is stored as the "forward" routes. For example, if a railcar R at position 40 in the train T can communicate to railcars R 38, 39, 41, and 42, the locomotive L will configure node 40 to "route" data destined for locomotive L to either railcar R 38 or 39); (8) using the same information, the locomotive L will also send a message over the trainline TL to configure each node to "route" packets not destined for the locomotive L to a node further back on the train T—(These are stored as "backward" routes. Using the same example set forth above, node 40 will be told or instructed to route data destined for any other node to either node 41 or 42); and (9) after each node has been configured, the locomotive L will validate that all nodes are connected and enter ECP RUN or SWITCH Mode.

During normal operation, and in this preferred and non-limiting embodiment, the following sequence would occur at each node when it receives a packet: (1) device 14 receives a packet from an adjacent node on the wireless network; (2) the device 14 examiners the message to determine the packet destination address; and (3) the device 14 queries the node computer 12 to determine: (a) if the destination is the current node, then the device 14 processes the packet; (b) if the destination address is equal to an address in the "adjacent" list, then the device 14 sends the packet directly to the destination; (c) if the destination address is locomotive L, then the packet is routed to a "forward" node; and (d) if the destination address is unknown, then the packet is routed to a "backward" node.

In another preferred and non-limiting embodiment, and as discussed above, many of the wireless technologies may provide embedded protocols for supporting self-forming "mesh" networks. In the above-described example, the locomotive L configures each device 14 with a list of nodes to use for routing data packets up the train T to the locomotive L, or backwards towards the end-of-train. However, if the high-speed access technology of the train network management system 10 supports such self-forming networks, a process may be used to prevent this network from communicating with other trains T nearby.

In this embodiment, the high-speed network is self-formed, but uses the unique railcar R, locomotive L, and/or train T identification provided on the trainline TL to force the network to connect to only other devices that are connected to the same identification. Based, for example, on a unique train T identification, the network may not understand to "ignore" information and data that includes another train T identification. In this embodiment, a message or data packet with a destination address of the locomotive L would be forwarded to the next node with the least number of "hops" to the locomotive L. Packets with a destination not equal to the locomotive L would be routed to a node with a greater number of "hops." This would effectively route the message away from the locomotive L until it reaches the destination device 14.

In this preferred and non-limiting embodiment, the setup sequence would be as follows: (1) the ECP system is initialized and the locomotive L contains a list of all of the trailing devices 14 and/or railcars R and their sequence in the train T, per the S-4200 Standard; (2) each device 14 sends the unique train identification that is being received in the connected head-end-unit (HEU) beacon on the trainline TL network to the node computer 12; (3) the locomotive L sends a message on the trainline TL commanding or instructing each trailing device 14 to enable their wireless network device 36 and/or wired network device 40 on a specified channel and/or frequency; (4) each device 14 transmits its static identifier and unique train identification at regular intervals in order to broadcast its availability to other devices 14 in close proximity; (5) each device 14 also scans their surroundings and attempts to connect to other devices 14 that are advertising if they are connected to the same train identification; (6) as the devices 14 connect, they also look for a network past the locomotive L by querying each connected node for the number of "hops" it has found to the locomotive L—(For example, railcar R1 next to the locomotive L would connect directly to the locomotive L. Railcar R2 would then see that railcar R1 has 1 "hop" to the locomotive L, and will try to route data destined to the locomotive L to railcar R1); (7) after making a connection, each device 14 regularly queries all of the other devices 14 to which it is connected for the number of "hops" away from the locomotive L in order to maintain a database in the node computer 12; and (8) after each node has been configured, the locomotive L will validate that all nodes are connected and enter the ECP RUN or SWITCH Mode.

In this embodiment, and during normal operation, the following sequence would occur at each node when it receives a packet: (1) the device 14 receives a packet from an adjacent node on the wireless network; (2) the device 14 examines the message to determine the packet destination address; and (3) the node queries the node computer 12 to determine: (a) if the destination is the current node, then the device processes the packet; (b) if the destination address is equal to an address in the "adjacent" list, then the node sends the packet directly to the destination; (c) if the destination address is the locomotive L, then the packet is routed to the node that has the least number of "hops" to locomotive L; and (d) if the destination address is unknown, then the packet is routed to the node that has the most number of "hops" to the locomotive L.

Figure 7:
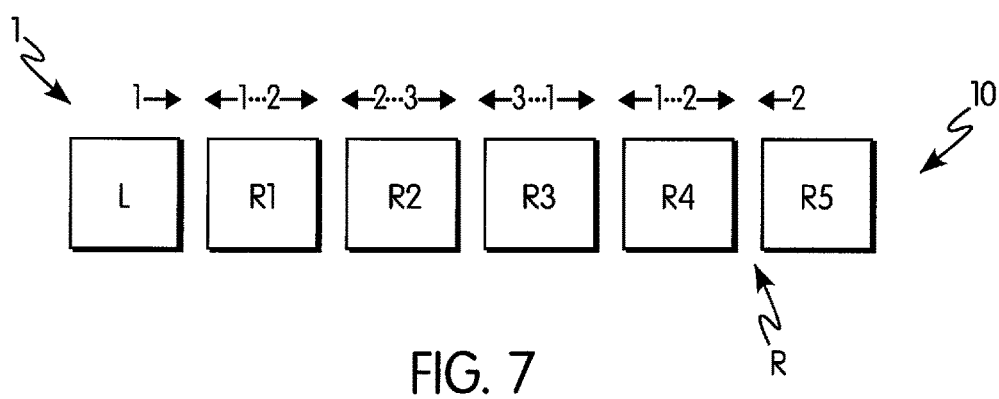
FIG. 7 is a schematic view of another embodiment of a train network management system according to the principles of the present invention.

In a further preferred and non-limiting embodiment, and as illustrated in schematic form in FIG. 7, the train network management system 10 may use high-speed network devices 14 that support multiple channels. Accordingly, in another embodiment, each device 14 may include multiple radios or the like that are installed on the device 14, or alternatively, a single wide-band radio that can support multiple frequency channels simultaneously. In this method, and after the ECP system has been initialized, the locomotive L would assign each device 14 (or group of devices 14) to a specific channel or frequency group. Devices 14 that are close together on the train T would exchange data on the same frequency. However, devices 14 would send data to another device 14, such as an adjacent device, on another frequency. The locomotive L would assign the frequencies, such that the adjacent networks would not overlap. In addition, the locomotive L would assign certain devices 14 a second frequency channel that it would use to send data to the adjacent network of devices 14. In this manner, a multi-channel or multi-frequency high-speed network is provided.

Accordingly, and in the exemplary embodiment of FIG. 7, the locomotive L sends data to the first railcar R using channel 1, and the first railcar R1 would then use channel 2 to send data to the second railcar R2. A similar configuration would be used along the train with respect to railcars R3-R5. Accordingly, the channels 1-3 are assigned by the locomotive L to reduce overlap and adjacent node interference.

In this preferred and non-limiting embodiment, the setup sequence would be as follows: (1) the ECP system is initialized, and locomotive L (or locomotive computer 16)

contains a list of all the trailing devices 14 and/or corresponding railcars R, as well as their sequence in the train T, per the S-4200 Standard; (2) the locomotive L sends a query to each device 14 on the trainline TL, requesting a list of radio channels that are supported; (3) the locomotive L then assigns each railcar R a radio channel to use to route messages to the locomotive L, as well as the identifier of device 14 with which to make a connection in the assigned channel; (4) the locomotive L also assigns each railcar R a radio channel to use to route data to the end-of-train, as well as the identifier of the device 14 with which to make a connection in the assigned channel; (5) the locomotive L then sends a message on the trainline TL commanding or instructing each trailing device 14 to enable the wireless network device and/or wired network device 40 on a specific channel or frequency; (6) each device 14 scans their surroundings and attempts to connect to the nodes provided to the device 14 by the locomotive L in steps 3 and 4 above; (7) in addition to connecting to the node specified in steps 3 and 4 above, the device 14 also connects to any other node operating on the same channel, and connected to the same train identification (i.e., the same train T); and (8) after each node has been configured, the locomotive L will validate that all the nodes are connected, and enter the ECP RUN or SWITCH Mode.

The routing of packets in this embodiment would be the same as discussed above; however, since different frequency channels are being used, the devices 14 could send and receive simultaneously. This increases the bandwidth by avoiding having all of the devices 14 share the same frequency. As discussed above, there are multiple wireless technologies and standards that would support the above process, especially those technologies that have several protocol layers that would allow a node to connect to another node on a particular frequency channel. Many of these technologies also support mesh networking protocols (as discussed above) that would manage the "hopping" of packets from one node, through multiple intermediate nodes, to the destination node.

In this manner, provided is a train network management system that provides a high-speed network on a train T to allow rail operators and infrastructure owners to collect valuable information and data from the train T. In addition, the system 10 provides a high-speed data network that can be overlaid on the existing network and infrastructure of the train, such as a train T including a trainline TL. Although ECP technology provides power and communications to each railcar R, the bandwidth limitations inhibit growth. Using the high-speed protocol of the present invention to route information from railcar R to railcar R, or railcar R to locomotive L, would considerably open up the available bandwidth. Still further, and in order to efficiently deploy the system 10, the existing trainline TL may be used and provide a way of efficiently setting up the nodes so that data can be routed to the correct locomotive L in an efficient and effective manner.

The present invention may be implemented on a variety of computing devices and systems, including the client devices and/or server computer, wherein these computing devices include the appropriate processing mechanisms and computer-readable media for storing and executing computer-readable instructions, such as programming instructions, code, and the like. In addition, aspects of this invention may be implemented on existing controllers, control systems, and computers integrated or associated with, or positioned on, the locomotive L and/or any of the railcars R. For example, the presently-invented system 10 or any of its functional components can be implemented wholly or partially on a train management computer, a Positive Train Control computer, an on-board controller or computer, a railcar computer, and the like. Still further, the functions and computer-implemented features of the present invention may be in the form of software, firmware, hardware, programmed control systems, microprocessors, and the like.

Figure 8:
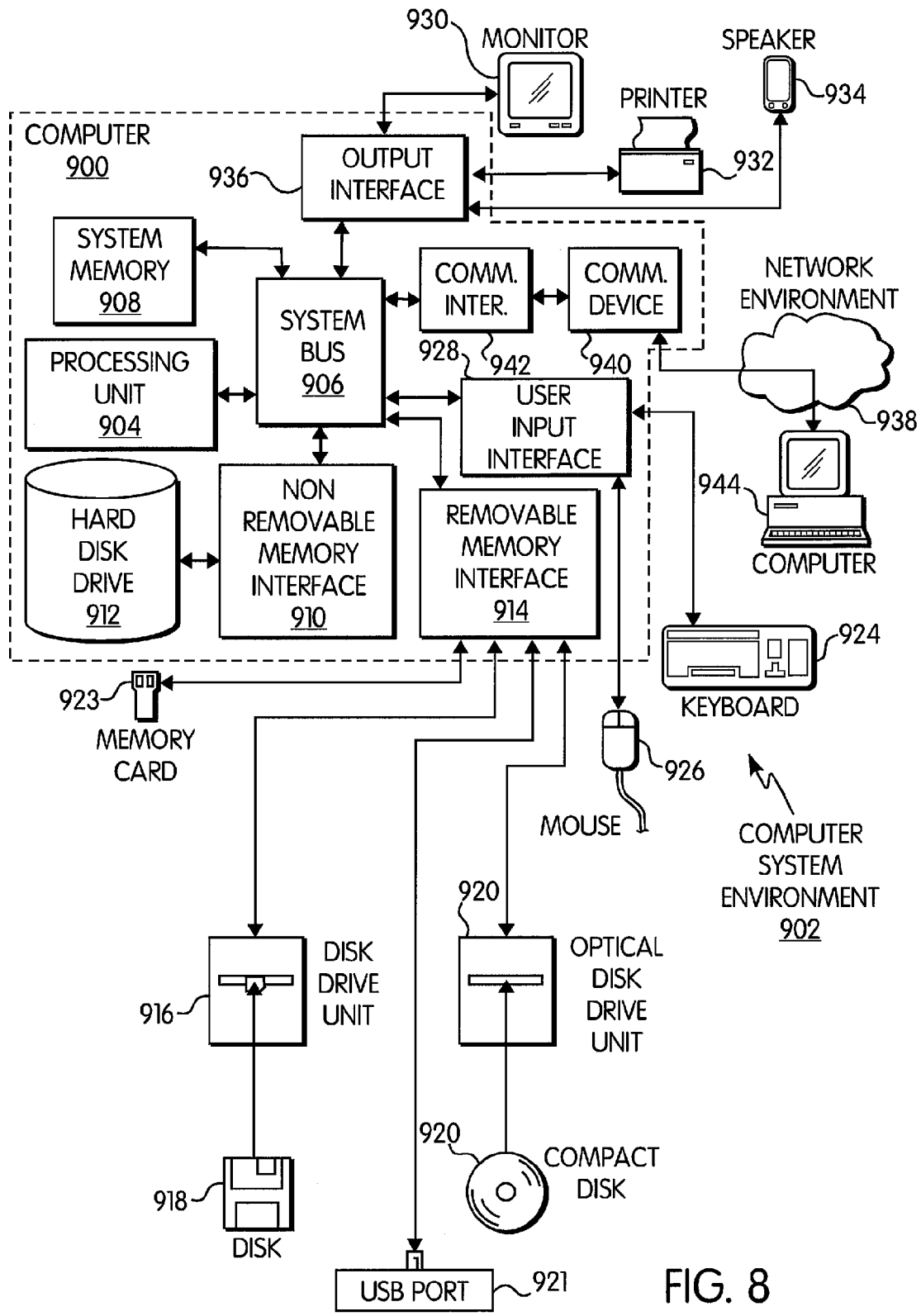
FIG. 8 is a schematic diagram of a computer and network infrastructure according to the prior art.

As shown in FIG. 8, personal computers 900, 944, in a computing system environment 902 are provided. This computing system environment 902 may include, but is not limited to, at least one computer 900 having certain components for appropriate operation, execution of code, and creation and communication of data. For example, the computer 900 includes a processing unit 904 (typically referred to as a central processing unit or CPU) that serves to execute computer-based instructions received in the appropriate data form and format. Further, this processing unit 904 may be in the form of multiple processors executing code in series, in parallel, or in any other manner for appropriate implementation of the computer-based instructions.

In order to facilitate appropriate data communication and processing information between the various components of the computer 900, a system bus 906 is utilized. The system bus 906 may be any of several types of bus structures, including a memory bus or memory controller, a peripheral bus, or a local bus using any of a variety of bus architectures. In particular, the system bus 906 facilitates data and information communication between the various components (whether internal or external to the computer 900) through a variety of interfaces, as discussed hereinafter.

The computer 900 may include a variety of discrete computer-readable media components. For example, this computer-readable media may include any media that can be accessed by the computer 900, such as volatile media, non-volatile media, removable media, non-removable media, etc. As a further example, this computer-readable media may include computer storage media, such as media implemented in any method or technology for storage of information, such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 900. Further, this computer-readable media may include communications media, such as computer-readable instructions, data structures, program modules, or other data in other transport mechanisms and include any information delivery media, wired media (such as a wired network and a direct-wired connection), and wireless media. Computer-readable media may include all machine-readable media with the sole exception of transitory, propagating signals. Of course, combinations of any of the above should also be included within the scope of computer-readable media.

As seen in FIG. 8, the computer 900 further includes a system memory 908 with computer storage media in the form of volatile and non-volatile memory, such as ROM and RAM. A basic input/output system (BIOS) with appropriate computer-based routines assists in transferring information between components within the computer 900 and is normally stored in ROM. The RAM portion of the system memory 908 typically contains data and program modules that are immediately accessible to or presently being operated on by processing unit 904, e.g., an operating system, application programming interfaces, application programs, program modules, program data and other instruction-based computer-readable codes.

With continued reference to FIG. 8, the computer 900 may also include other removable or non-removable, volatile or non-volatile computer storage media products. For example, the computer 900 may include a non-removable memory interface 910 that communicates with and controls a hard disk drive 912, i.e., a non-removable, non-volatile magnetic medium; and a removable, non-volatile memory interface 914 that communicates with and controls a magnetic disk drive unit 916 (which reads from and writes to a removable, non-volatile magnetic disk 918), an optical disk drive unit 920 (which reads from and writes to a removable, non-volatile optical disk 922, such as a CD ROM), a Universal Serial Bus (USB) port 921 for use in connection with a removable memory card, etc. However, it is envisioned that other removable or non-removable, volatile or non-volatile computer storage media can be used in the exemplary computing system environment 900, including, but not limited to, magnetic tape cassettes, DVDs, digital video tape, solid state RAM, solid state ROM, etc. These various removable or non-removable, volatile or non-volatile magnetic media are in communication with the processing unit 904 and other components of the computer 900 via the system bus 906. The drives and their associated computer storage media discussed above and illustrated in FIG. 8 provide storage of operating systems, computer-readable instructions, application programs, data structures, program modules, program data and other instruction-based computer-readable code for the computer 900 (whether duplicative or not of this information and data in the system memory 908).

A user may enter commands, information, and data into the computer 900 through certain attachable or operable input devices, such as a keyboard 924, a mouse 926, etc., via a user input interface 928. Of course, a variety of such input devices may be utilized, e.g., a microphone, a trackball, a joystick, a touchpad, a touch-screen, a scanner, etc., including any arrangement that facilitates the input of data, and information to the computer 900 from an outside source. As discussed, these and other input devices are often connected to the processing unit 904 through the user input interface 928 coupled to the system bus 906, but may be connected by other interface and bus structures, such as a parallel port, game port, or a universal serial bus (USB). Still further, data and information can be presented or provided to a user in an intelligible form or format through certain output devices, such as a monitor 930 (to visually display this information and data in electronic form), a printer 932 (to physically display this information and data in print form), a speaker 934 (to audibly present this information and data in audible form), etc. All of these devices are in communication with the computer 900 through an output interface 936 coupled to the system bus 906. It is envisioned that any such peripheral output devices be used to provide information and data to the user.

The computer 900 may operate in a network environment 938 through the use of a communications device 940, which is integral to the computer or remote therefrom. This communications device 940 is operable by and in communication to the other components of the computer 900 through a communications interface 942. Using such an arrangement, the computer 900 may connect with or otherwise communicate with one or more remote computers, such as a remote computer 944, which may be a personal computer, a server, a router, a network personal computer, a peer device, or other common network nodes, and typically includes many or all of the components described above in connection with the computer 900. Using appropriate communication devices 940, e.g., a modem, a network interface or adapter, etc., the computer 900 may operate within and communication through a local area network (LAN) and a wide area network (WAN), but may also include other networks such as a virtual private network (VPN), an office network, an enterprise network, an intranet, the Internet, etc. It will be appreciated that the network connections shown are exemplary and other means of establishing a communications link between the computers 900, 944 may be used.

As used herein, the computer 900 includes or is operable to execute appropriate custom-designed or conventional software to perform and implement the processing steps of the method and system of the present invention, thereby, forming a specialized and particular computing system. Accordingly, the presently-invented method and system may include one or more computers 900 or similar computing devices having a computer-readable storage medium capable of storing computer-readable program code or instructions that cause the processing unit 902 to execute, configure or otherwise implement the methods, processes, and transformational data manipulations discussed hereinafter in connection with the present invention. Still further, the computer 900 may be in the form of a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A train network management system for providing redundancy or fail-safe functionality to a train comprising at least one locomotive, a plurality of railcars, and a trainline establishing a wired communication between the plurality of railcars and the at least one locomotive, the system comprising:

a plurality of node computers positioned on or integrated with a plurality of the railcars, wherein each node computer of the plurality of node computers is configured to communicate with at least one high-speed network device configured to receive and transmit data over a high-speed network, wherein at least one of the following: each node computer, the at least one high-speed network device, at least one associated railcar, or any combination thereof, is assigned a unique identifier; and at least one locomotive computer positioned on or integrated with the at least one locomotive and configured to: (i) establish the high-speed network by communicating with the plurality of node computers via the trainline, and (ii) communicate with the at least one high-speed network device configured to receive and transmit data over the high-speed network, wherein at least one of at least one node computer of the plurality of node computers and the at least one locomotive computer is configured to generate at least one communication path between at least two high-speed network devices of at least two railcars and a high-speed network device of the at least one locomotive, such that high-speed data communication is provided between the at least two high-speed network device of the at least two railcars and the high-speed network device of the at least one locomotive, wherein the at least one communication path is in addition to a communication path of the wired communication established by the trainline.

2. The train network management system of claim 1, wherein the high-speed network device is at least one of the following: a wireless network device, a wired network device, a WiFi network device, a Bluetooth network device, a Zigbee network device, a WirelessHART network device, a GPRS network device, an ultra-wideband network device, a cable network device, a wide-band network device, a multi-radio network device, or any combination thereof.

3. The train network management system of claim 1, wherein the at least one communication path comprises a plurality of high-speed network devices of a respective plurality of railcars, each of the plurality of high-speed network devices assigned to communicate with at least one of at least one leading high-speed network device and at least one trailing high-speed network device.

4. The train network management system of claim 1, wherein the at least one communication path comprises a plurality of high-speed network devices arranged for communication in a mesh network arrangement.

5. The train network management system of claim 1, further comprising a primary communication path and at least one secondary communication path, wherein the at least one secondary communication path is utilized based at least partially upon the status of the primary communication path.

6. The train network management system of claim 1, wherein at least one of the following: at least one node computer of the plurality of node computers, the at least one high-speed network device, the at least one locomotive computer, or any combination thereof, is configured to:
(i) determine which high-speed network devices are within communication range; and
(ii) establish a session with at least one of the high-speed network devices within communication range.

7. The train network management system of claim 6, wherein at least one of the determining step and the establishing step are based at least in part on at least one of the following: the at least one communication path, route length, frequency, signal strength, device type, device functionality, data type, communication type, instructions from the at least one node computer, instructions from the at least one locomotive computer, node computer identifier, locomotive computer identifier, high-speed network device identifier, railcar identifier, locomotive identifier, train identifier, or any combination thereof.

8. The train network management system of claim 1, further comprising:
a wired communication line extending between the at least one locomotive and the plurality of railcars; and at least one interface device positioned on or integrated with a respective railcar and in communication with at least one node computer of the plurality of node computers, wherein the at least one node computer is configured to receive data from wired communication line via the at least one interface device.

9. The train network management system of claim 8, wherein the wired communication line is the trainline and the at least one interface device is an EIA-709 interface device.

10. The train network management system of claim 8, wherein data including at least one of the following: the unique identifier of the railcar, a unique identifier of the at least one locomotive, at least a portion of the communication path, network management information, or any combination thereof, is transmitted over the wired communication line.

11. The train network management system of claim 1, wherein at least one node computer of the plurality of node computers is in communication with at least one sensor device configured to sense at least one condition at or near a specified railcar.

12. The train network management system of claim 11, wherein the at least one node computer is configured to generate train data based at least partially on the sensed condition.

13. The train network management system of claim 12, wherein the train data comprises at least one of the following: locomotive data, railcar data, environmental data, equipment data, failure data, acoustic data, temperature data, accelerometer data, strain gauge data, linear displacement data, laser displacement data, input/output data, activity data, video data, pressure data, part data, condition data, derailment data, heuristic data, diagnostic data, or any combination thereof.

14. The train network management system of claim 1, wherein the at least one communication path includes an assignment of priority to at least one of the high-speed network devices.

15. The train network management system of claim 14, wherein the priority comprises a designated channel comprising at least two high-speed network devices.

16. The train network management system of claim 1, wherein the high-speed network devices of each railcar are configured to broadcast a status at specified intervals.

17. The train network management system of claim 1, wherein the high-speed network device comprises a wireless network device having at least one wireless antenna and configured for wireless communication.

18. The train network management system of claim 1, wherein the high-speed network device comprises a wired network device having at least one high-frequency interface and configured for communication over at least one wired communication line.

19. The train network management system of claim 18, wherein the at least one wired communication line is the trainline.

20. A computer-implemented method of managing a network on a train to provide redundancy or fail-safe functionality, comprising at least one locomotive and a plurality of railcars, wherein a wired communication line extends by and between the at least one locomotive and the plurality of railcars, the method comprising:
providing at least one node computer on a plurality of the railcars, the at least one node computer configured to communicate with at least one high-speed network device for receiving and transmitting data over a high-speed network;

providing at least one locomotive computer on at least one locomotive, the locomotive computer configured to communicate with at least one high-speed network device for receiving and transmitting data over the high-speed network;

establishing the high-speed network over the wired communication line;

determining, by the at least one locomotive computer, a unique identifier for at least one of the node computer of the railcar, a high-speed network device of the railcar, and the associated railcar;

generating, by at least one of the at least one node computer and the at least one locomotive computer, at least one communication path between at least two specified high-speed network devices of at least two railcars and a high-speed network device of the locomotive, wherein the at least one communication path is in addition to a communication path of the wired communication line; and transmitting the at least one communication path over the wired communication line to at least two of the specified high-speed network devices.

\* \* \* \* \*